(12) United States Patent
Chung et al.

(10) Patent No.: US 11,733,551 B2
(45) Date of Patent: Aug. 22, 2023

(54) ADIABATIC COUPLING PHASE MODULATION MODULE, DEVICE AND QUANTUM KEY DISTRIBUTION SYSTEM

(71) Applicant: NATIONAL CENTRAL UNIVERSITY, Taoyuan (TW)

(72) Inventors: Hung-Pin Chung, Kaohsiung (TW); Kuang-Hsu Huang, Kaohsiung (TW); Tsung-Yeh Ho, Taipei (TW); I-Ting Chung, Taoyuan (TW); Yen-Hung Chen, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 17/660,975

(22) Filed: Apr. 27, 2022

(65) Prior Publication Data

US 2023/0096754 A1    Mar. 30, 2023

(30) Foreign Application Priority Data

Sep. 29, 2021 (TW) ................... 110136210
Oct. 12, 2021 (TW) ................... 110137772
Apr. 11, 2022 (TW) ................... 111113623

(51) Int. Cl.
*H04B 10/00* (2013.01)
*G02F 1/01* (2006.01)
(Continued)

(52) U.S. Cl.
CPC ............. *G02F 1/011* (2013.01); *H04B 10/70* (2013.01); *H04L 9/0858* (2013.01);
(Continued)

(58) Field of Classification Search
CPC ....................................................... H04B 10/70
See application file for complete search history.

(56) References Cited

U.S. PATENT DOCUMENTS 10,158,481 B2   12/2018   Bunandar et al.
10,511,437 B1   12/2019   Ustimchik et al.
(Continued)

OTHER PUBLICATIONS

Hung-Pin Chung, et al., Broadband On-Chip Polarzation Mode Splitters in Lithium Niobate Integrated Adiabatic Couplers, Optics Express, vol. 27, No. 2, Jan. 21, 2019, pp. 1632-1645.
(Continued)

*Primary Examiner* — Daniel G Dobson
(74) *Attorney, Agent, or Firm* — Rosenberg, Klein & Lee (57) ABSTRACT

An adiabatic coupling phase modulation module has an optical substrate, an asymmetric adiabatic coupling polarization beam splitter and two electro-optical phase modulators. The asymmetric adiabatic coupling polarization beam splitter performs band spatial filtering on a quantum light source signal to output a light source signal of a specific wavelength band, and performs polarization spatial filtering on the light source signal of specific wavelength band to output a first orthogonal polarization direction light source signal of the specific wavelength band and a second orthogonal polarization direction light source signal of the specific wavelength band. The two electro-optical phase modulators respectively perform phase coding processes on the first orthogonal polarization direction light source signal and the second orthogonal polarization direction light source signal.

20 Claims, 5 Drawing Sheets

(51) Int. Cl.
H04L 9/08 (2006.01)
H04B 10/70 (2013.01)
H04J 14/00 (2006.01)

(52) U.S. Cl.
CPC ...... *G02F 2203/05* (2013.01); *G02F 2203/07* (2013.01); *G02F 2203/50* (2013.01)

(56) References Cited

U.S. PATENT DOCUMENTS

2005/0189478 A1    9/2005   Lagasse
2009/0103736 A1    4/2009   Pacher et al.
2020/0127737 A1*   4/2020   Li ........................ G02B 27/283

OTHER PUBLICATIONS

J.L. Jackel, et al., Proton Exchange for High-Index Waveguides in LiNbO3, Appl. Phys. Lett. 41, 607 (1982), https.//doi.org/10.1063/1.93615.

* cited by examiner

ADIABATIC COUPLING PHASE MODULATION MODULE, DEVICE AND QUANTUM KEY DISTRIBUTION SYSTEM

CROSS-REFERENCE

This present disclosure claims foreign priorities of TW patent Application with a serial number 110136210 filed to TWIPO on 2021 Sep. 29, TW patent Application with a serial number 110137772 filed to TWIPO on 2021 Oct. 12, and TW patent Application with a serial number 111113623 filed to TWIPO on 2022 Apr. 11. All contents of the above patent application disclosure are included in the present disclosure.

TECHNICAL FIELD

The present disclosure relates to an adiabatic coupling phase modulation module and device used for a quantum key distribution (QKD) system, and particularly to an adiabatic coupling phase modulation module and device with band spatial filtering, polarization spatial filtering and single-channel independent phase modulation.

RELATED ART

The foundation of traditional communication encryption technology is based on complex mathematical problems, but under the continuous development of computing technology, there are already predictable security concerns. In recent years, with the technological development of quantum technology, optical quantum signal systems have been proposed, and one of the applications of the optical quantum signal system is a quantum key distribution system. The quantum key distribution system is an encryption system established based on the basic laws of quantum mechanics (that is, an encryption system implemented through quantum key distribution technology), so the encryption system basically has nearly perfect key security. The quantum key distribution system is currently being valued by various parties, and has a wide range of applications and development.

The quantum key distribution system is different from the existing optical communication system in principle, and the difference between the two systems is that the quantum key distribution system mainly uses a single photon as the medium for signal transmission, but the existing optical communication system uses conventional laser source as the medium for signal transmission. Further, the transmitter end of the quantum key distribution system uses a single-photon light source to transmits the photon, and performs signal coding in combination with the quantum key distribution technology and protocol, and the receiver end of the quantum key distribution system uses a single-photon detector to receive the encrypted signal, so as to decode the signal and establishes the key, therefore achieving quantum key distribution. According to different quantum key distribution protocols and the type of single-photon source used, after the single-photon light source at the transmitter end generates a single-photon signal, the quantum key distribution system also needs to perform corresponding optical signal processing to meet various application requirements.

The details of quantum key distribution system can be referred to U.S. issued U.S. Pat. No. 10,158,481 B2, and such patent provides a quantum key distribution system using phase encoding, and describes various optical components of attenuators, couplers, filters and phase modulator required in the system, so as to form the transmitter end and the receiver end of the quantum key distribution system.

In addition, U.S. issued U.S. Pat. No. 10,511,437 B1 provides a quantum key distribution system for high-speed polarization coding. In the system of such patent, the electro-optical phase controller is used to adjust the phase of the light in the optical path, and the electro-optical effect and the applied electric field are then used to change the direction of the optical axis inside the crystal, so that the light in the polarization direction of the fast optical axis and the light in the polarization direction of the slow optical axis have different delays, and the polarization state of photons can be controlled. In this way, the system can use the results of different polarization states to perform signal coding and output the encoded optical signals. However, the system uses optical fibers to connect various optical components, so additional fiber material costs are required, and the added multiple optical fiber junctions will generate unnecessary coupling losses, thereby reducing the efficiency of the system.

Next, US Published Application US 2005/0189478A1 provides an integration solution for a quantum key distribution system. The integration solution uses bulk optical crystals for optical signal processing in free space, and integrates various optical components into a single package box. The integration solution can effectively reduce the volume of the overall quantum key distribution system. However, in free space, the optical path between each optical element must be precisely adjusted and corrected to ensure the coupling efficiency of the photon at each port. On the other hand, the integration solution increases the difficulty of assembling the whole module, so that in practice, the integration solution is not suitable for a large-scale mass production process.

In order to reduce the difficulty of packaging, U.S. Published Application US 2009/0103736A1 adopts an integrated optical path related technology. This application provides an integrated optical path integration solution for polarization quantum entanglement signal processing, wherein the integrated optical path integration solution utilizes a Y-branch splitter to divide the one optical path into two optical paths, and perform optical parameter conversion in separate optical channels. The two optical paths randomly generate photon pairs of corresponding polarization states. Then, the integrated optical path integration solution uses the Y-branch combiner to confluence the photon pairs of the two optical paths into the same channel, and uses the integrated optical path coupler for band spatial filtering. The integrated optical path integration solution realizes the advantages of the integrated optical path technology, and that is, the optical components are fabricated on a single chip, which can not only greatly reduce the volume of the components, but also reduce the difficulty of component packaging. However, the integrated optical path integration solution lacks the relevant structure of signal coding, and uses the traditional directional coupler structure as the filter splitting structure, which makes the coupling ratio and process parameters highly sensitive (i.e. easily affected by other factors). On the other hand, the integrated optical path integration solution has the technical problem of difficult yield control, and it is difficult to achieve an ideal light splitting condition, so the mass production feasibility of the integrated optical path integration solution is not high.

Based on the above, those skilled in the art are still striving to find an integrated optical waveguide chip that has the potential to be mass-produced and can be used to realize high-speed quantum encoding functions.

SUMMARY

An embodiment of the present disclosure provides an adiabatic coupling phase modulation module, and the adiabatic coupling phase modulation module comprises an optical substrate, an asymmetric adiabatic coupling polarization beam splitter and two electro-optical phase modulators. The optical substrate has a first side, a second side, a third side and a fourth side, wherein the second side is opposite to the first side, the third side is opposite to the fourth side, and each of the third side and the fourth side is adjacent to both of the first side and the second side. The asymmetric adiabatic coupling polarization beam splitter formed on the optical substrate and adjacent to the first side of the optical substrate is configured to perform band spatial filtering on a quantum light source signal, so as to output a light source signal of a specific wavelength band, and further configured to perform polarization spatial filtering on the light source signal of the specific wavelength band, so as to output a first orthogonal polarization direction light source signal of the specific wavelength band and a second orthogonal polarization direction light source signal of the specific wavelength band. The two electro-optical phase modulators formed on the optical substrate and adjacent to the second side of the optical substrate are configured to respectively perform phase coding processes on the first orthogonal polarization direction light source signal and the second orthogonal polarization direction light source signal.

Optionally, the optical substrate has a first optical waveguide, a second optical waveguide and a third optical waveguide formed on the optical substrate, the first optical waveguide, the second optical waveguide and the third optical waveguide extend from the first side to the second side, and along a direction from the fourth side to the third side, there are the first optical waveguide, the second optical waveguide and the third optical waveguide arranged; the optical substrate has a band spatial filtering structure formed on the optical substrate and between the first optical waveguide and the second optical waveguide, the optical substrate further has a polarization spatial filtering structure formed on the optical substrate and between the second optical waveguide and the third optical waveguide, and the two electro-optical phase modulation electrodes are respectively formed and arranged on surrounding areas of the second optical waveguide and the third optical waveguide; the first optical waveguide, the second optical waveguide, the third optical waveguide, the band spatial filtering structure, the polarization spatial filtering structure and the electro-optical phase modulation electrodes form the asymmetric adiabatic coupling polarization beam splitter and the two electro-optical phase modulators.

Optionally, the optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

Optionally, each of the first optical waveguide, the second optical waveguide and the third optical waveguide is implemented by a channel waveguide, a diffused waveguide, a ridged waveguide or a buried waveguide.

Optionally, along a direction from the first side to the second side, the band spatial filtering structure gradually departs away from the second optical waveguide and gradually approaches the first optical waveguide, and the band spatial filtering structure is configured to guide the light source signal of the specific wavelength band from the first optical waveguide to the second optical waveguide; along the direction from the first side to the second side, the polarization spatial filtering structure gradually departs away from the third optical waveguide and gradually approaches the second optical waveguide, and the polarization spatial filtering structure is configured to guide the first orthogonal polarization direction light source signal from the second optical waveguide to the third optical waveguide.

Optionally, the polarization spatial filtering structure is implemented by a polarization spatial filtering waveguide, and the polarization spatial filtering waveguide has a high polarization selectivity property, which merely transmits the first orthogonal polarization direction light source signal.

Optionally, the two electro-optical phase modulation electrodes are configured to receive at least one phase modulation electric signal, so as to independently and respectively modulate phase properties of photons in the second optical waveguide and the third optical waveguide.

Optionally, each of the two electro-optical phase modulation electrodes is implemented by a coplanar waveguide electrode with high speed modulation capability, and an insulation layer is disposed between each of the two electro-optical phase modulation electrodes and the optical substrate, wherein the insulation layer is configured to adjust an radio frequency equivalent refractive index to match frequency equivalent refractive index and an optical waveguide modal equivalent refractive index.

An embodiment of the present disclosure provides an adiabatic coupling phase modulation device, and the adiabatic coupling phase modulation device comprises the above adiabatic coupling phase modulation module and a package structure, wherein the package structure is configured to package the adiabatic coupling phase modulation module to form the adiabatic coupling phase modulation device.

An embodiment of the present disclosure provides a quantum key distribution system, and the quantum key distribution system comprises a transmitter module and a receiver module. The transmitter module is formed by the above adiabatic coupling phase modulation device, a quantum light source module and a signal control module. The quantum light source module transmits the quantum light source signal to the adiabatic coupling phase modulation device, the adiabatic coupling phase modulation device performs band spatial filtering, polarization spatial filtering and signal coding on the quantum light source signal, so as to output a first light signal, a second light signal and a third light signal, the second light signal and the third light signal are transmitted to an optical fiber network which perform quantum key distribution processes on the second light signal and the third light signal, and the first light signal is transmitted to the signal control module and acts as a signal for feedback control so as to control the quantum light source module and the signal control module.

A main objective of the present disclosure is to provide a solution of integrated structure, and the structure has functions band spatial filtering, polarization spatial filtering and single-channel independent phase modulation, therefore achieving a prepare work of photon signal coding by using single chip. Different from the prior art, the solution of the present disclosure combines the advantages of adiabatic coupling splitter structure and electro-optical phase modulation technology, and combines integrated optical path technology to integrate the optical quantum manipulation function into a single substrate, which can effectively improve product stability and realize the encoding function of the high-speed quantum key distribution system of the integrated optical waveguide chip, and thus the solution of the present disclosure has the potential to be mass-produced.

BRIEF DESCRIPTIONS OF DRAWINGS

The accompanying drawings are provided to enable those of ordinary skill in the art to understand the technology of the present disclosure. The drawings are incorporated in and constitute a part of the specification of the present disclosure. The drawings illustrate exemplary embodiments of the present disclosure and together with the descriptions of the present disclosure serve to explain the principles of the present disclosure.

DETAILS OF EXEMPLARY EMBODIMENTS

In order to make the descriptions of the present disclosure more detailed and complete, the following provides several illustrative descriptions for the implementation aspects and specific embodiments of the present disclosure, but this is not the only way to implement or use the specific embodiments of the present disclosure. Embodiments of the present disclosure will now be described, by way of example only, with reference to the accompanying drawings. The following drawings are dedicated for description, and they are schematic and exemplary, being not drawn and precisely allocated in accordance with the actual ratio, thus not limiting the present disclosure.

An embodiment of the present disclosure provides an adiabatic coupling phase modulation module with band spatial filtering, polarization spatial filtering and single-channel independent phase modulation. In the embodiment of the present disclosure, the adiabatic coupling phase modulation module itself is an integrated optoelectronic component, and it can be packaged to form an adiabatic coupling phase modulation device. The adiabatic coupling phase modulation module utilizes adiabatic coupling splitter structure and electro-optical phase modulation technology and combines integrated optical path technology to integrate the optical quantum manipulation function into a single substrate. Thus, the adiabatic coupling phase modulation module can act as an integrated optical waveguide chip for achieving high speed quantum encoding in the quantum key distribution system, and has the potential to be mass-produced.

The present disclosure claims the priority of TW patent Application with a serial number of 110136210. In such TW patent Application, an adiabatic coupling polarization splitter structure is proposed, and the adiabatic coupling polarization splitter structure can solve the problems which the directional coupler is facing. The adiabatic coupling polarization splitter structure is an N-shaped waveguide structure and is designed in an asymmetric and segmented manner, so as to achieve the function of band spatial filtering and polarization spatial filtering. Further, the theorems and applications of adiabatic coupling can be referred to the public document, "BROADBAND ON-CHIP POLARIZATION MODE SPLITTERS IN LITHIUM NIOBATE INTEGRATED ADIABATIC COUPLERS, Chung, Hung-Pin, et al., Optics express 27.2 (2019): 1632-1645".

In the chip design of the TW patent Application with a serial number of 110136210, the polarization spatial filtering structure is designed to have multiple waveguides, and by using the coupling effect of the waveguides, the polarization spatial filtering can be carried out. However, to extend the functionality and application fields of the chip, in the embodiment of the present disclosure, based on the foundation of the asymmetric adiabatic coupling polarization splitter component, the polarization spatial filtering structure of the adiabatic coupling phase modulation module is designed to adopt a combination structure of an high polarization selectivity waveguide and a dual polarization waveguide, so as to further purify the polarization purity of the output photons, and make the adiabatic coupling phase modulation module directly be applied in the existing quantum key distribution system. In this way, the high-purity polarized optical phase encoding method can be effectively used to achieve the purpose of improving the signal quality of the quantum key distribution system.

On the other hand, the adiabatic coupling phase modulation module of the embodiment of the present disclosure is a single integrated optoelectronic chip, and the single integrated optoelectronic chip has two electro-optical phase modulators for high-speed signal modulation. Via the two independent electro-optical phase modulators, users can perform signal coding on each independent single channel to expand the functionality of the chip, and directly achieve the functional requirements required by the transmitter of a quantum key distribution system by using a single chip. In other words, in the embodiment of the present disclosure, the structure design of the coplanar waveguide electrodes is added to the independent single-channel waveguide extended behind the polarization spatial filtering structure of the adiabatic coupling phase modulation module, and the electro-optical phase modulator with the high-speed modulation is integrated in the single chip, so as to achieve the purpose of high-speed quantum encoding function. In particular, the chip structure integration solution according to the embodiment of the present disclosure can realize multiple functional units into a single chip, thereby effectively reducing the volume of quantum key distribution equipment, reducing system construction costs, and enhancing market competitiveness.

It is noted that, although the principle of adiabatic coupling splitter structure and electro-optical phase modulation has been found in the literature, there is currently no literature to inform that the twos can be adjusted and modified to be implemented in a single integrated optical chip to improve the functional diversity of the integrated optical waveguide chip. Moreover, simply combining or easily modifying the existing literatures cannot obtain the design of the polarization spatial filtering structure with high polarization selectivity according to the embodiment of the present disclosure, and the polarization spatial filtering structure with high polarization selectivity is not easily thought by the person with the ordinary skill in art. The specific details and descriptions will be provided in the accompanying drawings later.

Figure 1:
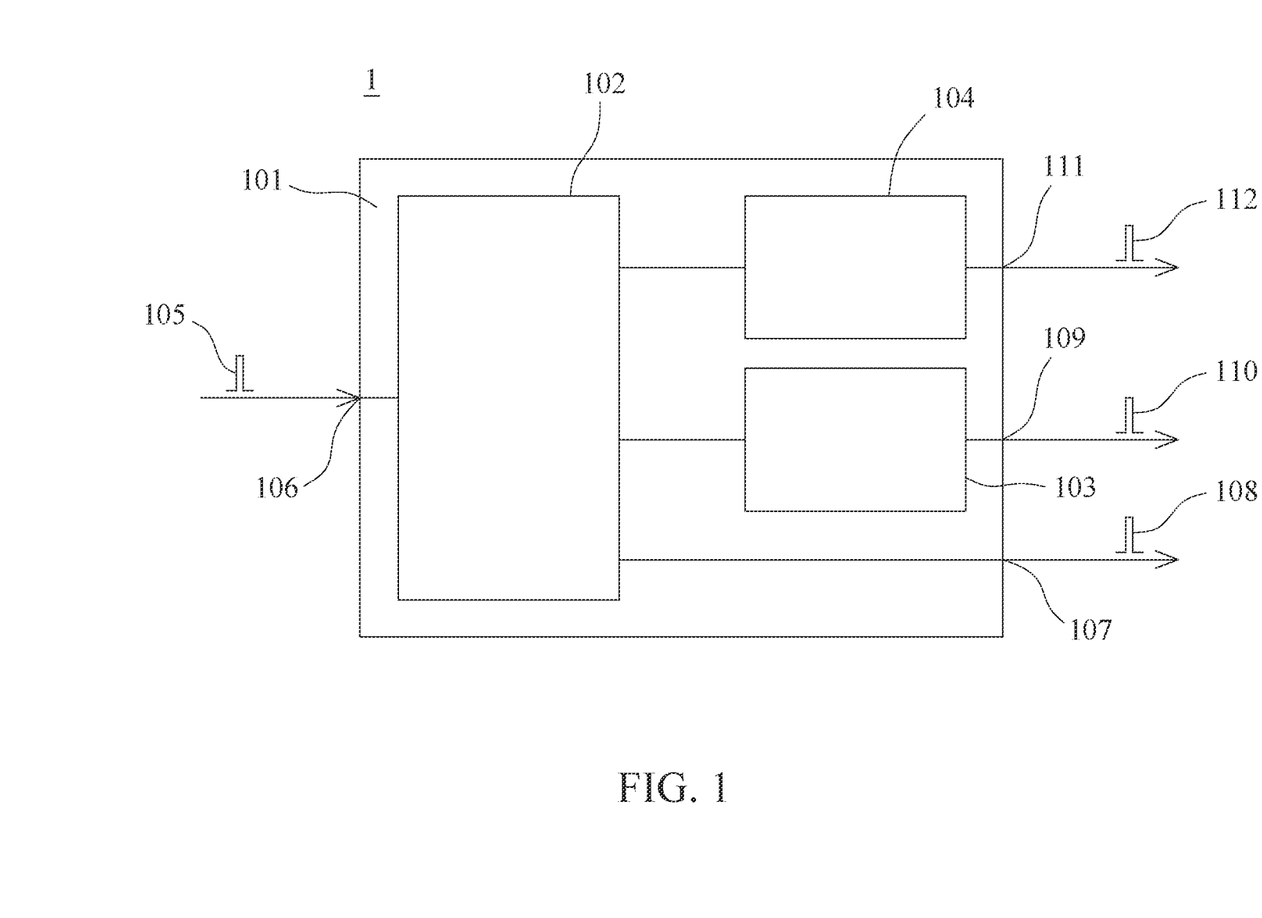
FIG. 1 is a function block diagram of an adiabatic coupling phase modulation module according to an embodiment of the present disclosure.

Refer to FIG. 1, and FIG. 1 is a function block diagram of an adiabatic coupling phase modulation module according to an embodiment of the present disclosure. The adiabatic coupling phase modulation module 1 comprises an optical substrate 101, an asymmetric adiabatic coupling polarization beam splitter 102 and two electro-optical phase modulators 103, 104. The optical substrate 101 has a first side (left side), a second side (right side) opposite to the first side, a third side (upper side) and a fourth side (lower side) opposite to the third side, wherein each of the third side and fourth side is adjacent to the first side and the second side. The optical substrate 101 can be a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

The asymmetric adiabatic coupling polarization beam splitter 102 and the electro-optical phase modulators 103, 104 are formed on the optical substrate 101, and the asymmetric adiabatic coupling polarization beam splitter 102 is disposed adjacent to the first side of the optical substrate 101. The electro-optical phase modulators 103, 104 are disposed adjacent to the second side of the optical substrate 101, and each of the electro-optical phase modulators 103, 104 and the asymmetric adiabatic coupling polarization beam splitter 102 are connected to each other. The adiabatic coupling phase modulation module 1 can further has a light source input terminal 106, a first light signal output terminal 107, a second light signal output terminal 109 and a third light signal output terminal 111. The asymmetric adiabatic coupling polarization beam splitter 102 is connected to the light source input terminal 106 and the first light signal output terminal 107, and the electro-optical phase modulators 103, 104 are respectively connected to the second light signal output terminal 109 and the third light signal output terminal 111.

To put it concretely, the quantum light source signal 105 enters adiabatic coupling phase modulation module 1 via the light source input terminal 106. The asymmetric adiabatic coupling polarization beam splitter 102 comprises a band spatial filtering unit and a polarization spatial filtering unit, and the band spatial filtering unit and the polarization spatial filtering unit are respectively configured to perform signal processing of band spatial filtering and polarization spatial filtering on the quantum light source signal 105. During the process of the band spatial filtering, the light source of a specific wavelength band is guided to the polarization spatial filtering of the asymmetric adiabatic coupling polarization beam splitter 102 for processing, and the light source of another one specific wavelength band is guided to the first light signal output terminal 107, and acts as a first light signal 108. During the process of the polarization spatial filtering, two orthogonal polarization direction light source signals in the light source signal of the specific wavelength band are respectively guided to the electro-optical phase modulators 103, 104. The electro-optical phase modulators 103, 104 are respectively configured to perform corresponding phase encoding processing, and the processed light signals then are respectively transmitted to the second light signal output terminal 109 and the third light signal output terminal 111, which respectively acts as the second light signal 110 and the third light signal 112, wherein the second light signal 110 and the third light signal 112 are light signals used in the quantum key distribution system.

Figure 2:
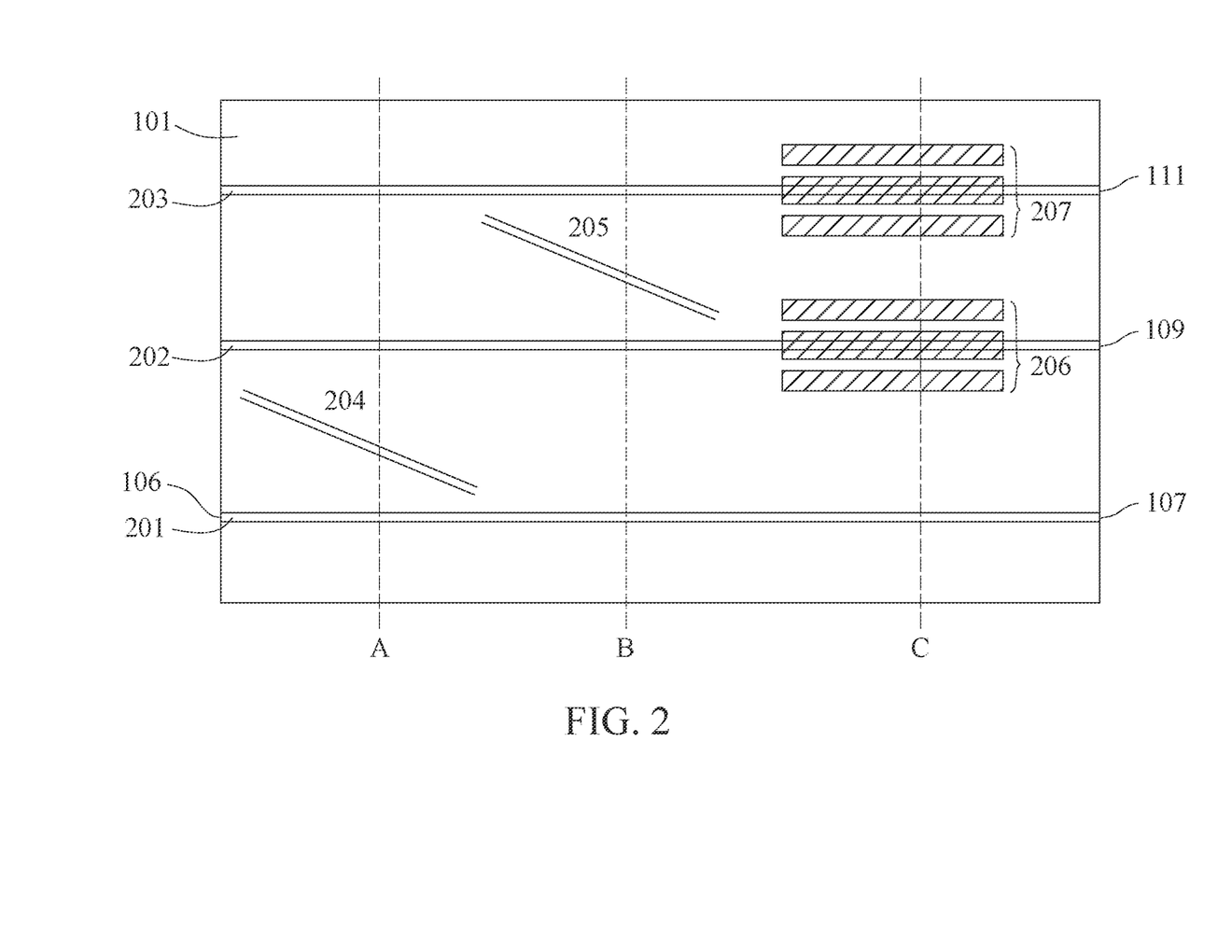
FIG. 2 is a schematic diagram of an integrated optical structure of an adiabatic coupling phase modulation module according to an embodiment of the present disclosure.

Refer to FIG. 1 and FIG. 2, and FIG. 2 is a schematic diagram of an integrated optical structure of an adiabatic coupling phase modulation module according to an embodiment of the present disclosure. The integrated optical structure of the adiabatic coupling phase modulation module comprises an optical substrate 101, a first optical waveguide 201, a second optical waveguide 202, a third optical waveguide 203, a band spatial filtering structure 204, a polarization spatial filtering structure 205 and two electro-optical phase modulation electrodes 206, 207. The first optical waveguide 201, the second optical waveguide 202, the third optical waveguide 203, the band spatial filtering structure 204, the polarization spatial filtering structure 205 and the two electro-optical phase modulation electrodes 206, 207 are formed on the optical substrate 101.

The first optical waveguide 201, the second optical waveguide 202 and the third optical waveguide 203 extend from the first side to the second side of the optical substrate 101, and along a direction from the fourth side to the third side of the optical substrate 101, there are the first optical waveguide 201, the second optical waveguide 202 and the third optical waveguide arranged 203. The electro-optical phase modulation electrodes 206, 207 are respectively formed and arranged on surrounding areas of the second optical waveguide 202 and the third optical waveguide 203. Each of the first optical waveguide 201, the second optical waveguide 202 and the third optical waveguide 203 is implemented by a channel waveguide, a diffused waveguide, a ridged waveguide or a buried waveguide, and the present disclosure is not limited thereto.

The band spatial filtering unit of the asymmetric adiabatic coupling polarization beam splitter 102 is formed by one part of the first optical waveguide 201, one part of the second optical waveguide 202 and the band spatial filtering structure 204. The two terminals of the first optical waveguide 201 are respectively connected to the light source input terminal 106 and the first light signal output terminal 107. The quantum light source signal 105 enters the first optical waveguide 201 via the light source input terminal 106, the band spatial filtering structure 204 guides the light source of the specific wavelength band to the second optical waveguide 202, and guides the light source of the other one specific wavelength band to the first light signal output terminal 107, wherein the light source of the other one specific wavelength band acts as the first light signal 108.

The polarization spatial filtering unit of the asymmetric adiabatic coupling polarization beam splitter 102 is formed by one part of the second optical waveguide 202, one part of the third optical waveguide 203 and the polarization spatial filtering structure 205. A specific orthogonal direction polarization light source signal in the second optical waveguide 202 is guided to the third optical waveguide 203 by using the polarization spatial filtering structure 205, and thus the third optical waveguide 203 merely has the specific orthogonal direction polarization light source signal therein. The specific orthogonal direction polarization light source signal in the third optical waveguide 203 propagates to the third light signal output terminal 111. The other one specific orthogonal direction polarization light source signal of the specific wavelength band is remained in the second optical waveguide 202 and propagates to the second light signal output terminal 109.

Further, along a direction from the first side to the second side of the optical substrate 101, the band spatial filtering structure 204 gradually departs away from the second optical waveguide 202 and gradually approaches the first optical waveguide 201, so as to achieve efficient band spatial filtering. Along a direction from the first side to the second side of the optical substrate 101, the polarization spatial filtering structure 205 gradually departs away from the third optical waveguide 203 and gradually approaches the second optical waveguide 202, so as to achieve efficient polarization spatial filtering. The polarization spatial filtering structure 205 can be implemented by a polarization spatial filtering waveguide, and the polarization spatial filtering waveguide has a high polarization selectivity property, which merely transmits the specific orthogonal polarization direction light source signal.

The electro-optical phase modulation electrode 206 and one part of the second optical waveguide 202 form the electro-optical phase modulator 103, and the electro-optical phase modulation electrode 207 and one part of the third optical waveguide 203 form the electro-optical phase modulator 104. The electro-optical phase modulation electrodes 206, 207 receive at least one phase modulation electric signal, so as to independently and respectively perform phase modulation on the specific orthogonal direction polarization light source signal in the second optical waveguide 202 and the other one specific orthogonal direction polarization light source signal in the third optical waveguide 203 (i.e. phase properties of photons in the second optical waveguide 202 and the third optical waveguide 203 are independently and respectively modulated). In such way, the phase encoding processing of the light signal is carried out.

In the embodiment, the electro-optical phase modulation electrodes 206 are three electrodes, and the electro-optical phase modulation electrodes 207 are three electrodes. However, the numbers of the electro-optical phase modulation electrodes 206, 207 are not used to limit the present disclosure. Further, each of the two electro-optical phase modulation electrodes 206, 207 is implemented by a coplanar waveguide electrode with high speed modulation capability, and an insulation layer is disposed between each of the two electro-optical phase modulation electrodes and the optical substrate 101, wherein the insulation layer is configured to adjust an radio frequency equivalent refractive index to match frequency equivalent refractive index and an optical waveguide modal equivalent refractive index. Therefore, the adiabatic coupling phase modulation module 1 can be applied in the quantum key distribution system which has the requirements of high-frequency and wide-band signal transmission.

Figure 3:
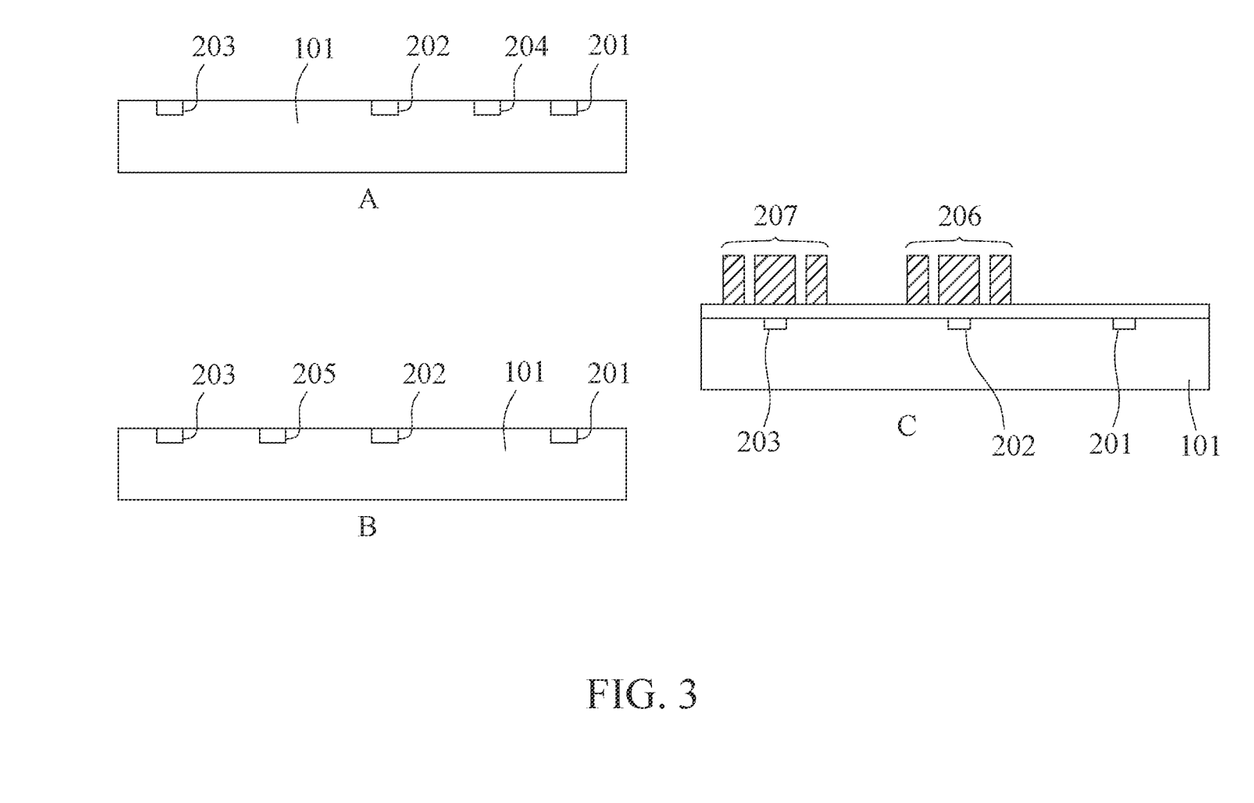
FIG. 3 is a schematic diagram of a cross section structure of an integrated optical structure of an adiabatic coupling phase modulation module according to an embodiment of the present disclosure.

Refer to FIG. 1 through FIG. 3, and FIG. 3 is a schematic diagram of a cross section structure of an integrated optical structure of an adiabatic coupling phase modulation module according to an embodiment of the present disclosure. The band spatial filtering unit adopts the N-shaped waveguide structure design, and the integrated optical cross section structure A of the band spatial filtering unit utilizes the band spatial filtering structure 204 as the coupling bridge between the first optical waveguide 201 and the second optical waveguide 202, so as to realize the energy coupling between the first optical waveguide 201 and the second optical waveguide 202 in the band spatial filtering unit. The band spatial filtering structure 204 guides the light source signal of the specific wavelength band to the second optical waveguide 202 from the first optical waveguide 201, and the second optical waveguide 202 and the third optical waveguide 203 in the band spatial filtering unit have a certain distance therebetween, so as to avoid the energy coupling between the second optical waveguide 202 and the third optical waveguide 203.

Further, the polarization spatial filtering unit adopts the N-shaped waveguide structure design, and the integrated optical cross section structure B of the polarization spatial filtering unit utilizes the polarization spatial filtering structure 205 as the coupling bridge between the second optical waveguide 202 and the third optical waveguide 203, so as to realize the energy coupling between the second optical waveguide 202 and the third optical waveguide 203 in the polarization spatial filtering unit. The polarization spatial filtering structure 205 guides the specific orthogonal direction polarization light source signal to the third optical waveguide 203 from the second optical waveguide 201, and the first optical waveguide 201 and the second optical waveguide 202 in the polarization spatial filtering unit have a certain distance therebetween, so as to avoid the energy coupling between the first optical waveguide 201 and the second optical waveguide 202. Further, in the integrated optical cross section structure C, the electro-optical phase modulation electrodes 206 are disposed on the upper, the left-upper and the right-upper of the second optical waveguide 202 without contacting the second optical waveguide 202, and the electro-optical phase modulation electrodes 207 are disposed on the upper, the left-upper and the right-upper of the third optical waveguide 203 without contacting the third optical waveguide 203.

Different from the prior art, in the embodiment of the present disclosure, the polarization spatial filtering structure 205 uses the design of a high polarization selectivity waveguide. This design solution allows the polarization spatial filtering structure 205 to transmit merely one specific polarization direction light source signal. In this way, only the specific polarization direction light source signal can be coupled to the third optical waveguide 203 through the polarization spatial filtering structure 205 to realize the function of polarization spatial filtering.

The high polarization selectivity waveguide can be realized by fabricating the optical waveguide by means of diffused ion doping. In the diffusion ion doping method, hydrogen ions can be selected as the diffusion source, and high temperature diffusion is performed on the substrate of nonlinear materials such as lithium niobate and lithium tantalate, and the lithium ions inside the crystal and the hydrogen ions in the diffusion source are exchanged. One of the polarization directions of the orthogonal polarizations changes correspondingly to the refractive index to form the high polarization selectivity waveguide. The theorems and manufacturing details of the high polarization selectivity waveguide can be referred to the public document, "PROTON EXCHANGE FOR HIGH-INDEX WAVEGUIDES IN LiNbO$_3$, Jackel, J. L., Rice, C. E., & Veselka, J. J. (1982), Applied Physics Letters, 41(7), 607-608", and the details are not repeated herein.

During the process of the band spatial filtering, through the geometric structure of the N-shaped waveguide, the coupling conditions between the optical waveguides are arranged and designed, and the stimulated Raman adiabatic passages (STIRAP) is completed in this way, so as to realize the broadband and low-loss adiabatic coupling conversion process. The relevant principles and solutions can be found in the TW patent application with the serial number of 110136210, which is one of the priorities claimed by the present disclosure, and will not be repeated herein.

Figure 4:
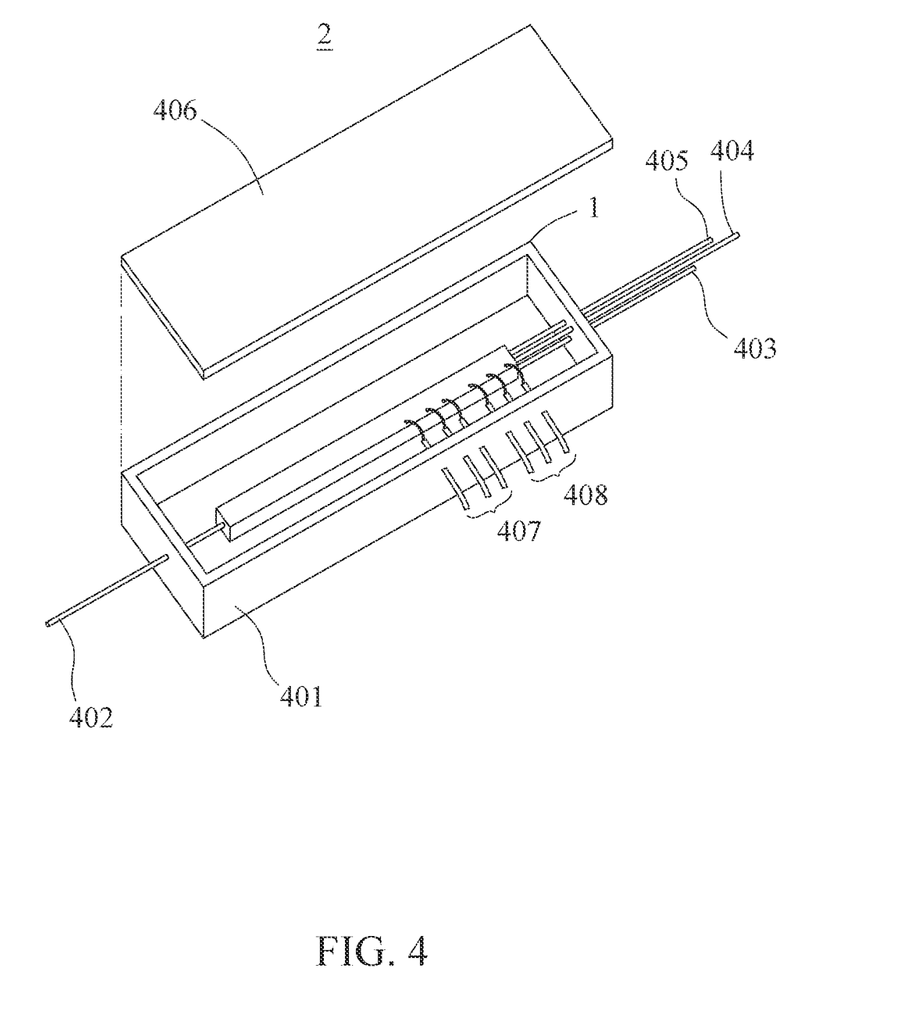
FIG. 4 is a schematic diagram of a package structure of an adiabatic coupling phase modulation device according to an embodiment of the present disclosure.

Refer to FIG. 1, FIG. 2 and FIG. 4, and FIG. 4 is a schematic diagram of a package structure of an adiabatic coupling phase modulation device according to an embodiment of the present disclosure. The package structure comprises a case 401, optical fiber assemblies 402, 403, 404, 405 and a top cover 406, and is configured to package the adiabatic coupling phase modulation module 1 to form the adiabatic coupling phase modulation device 2. Further, the adiabatic coupling phase modulation module 1 is installed and placed in the case 401, and the light source input terminal 106 on the first side of the optical substrate 101 can be connected to the optical fiber assembly 402. The first light signal output terminal 107, the second light signal output terminal 109 and the third light signal output terminal 111 on the second side of the optical substrate 101 can be respectively connected to the optical fiber assemblies 403, 404, 405. The electro-optical phase modulation electrodes 206, 207 are respectively connected to the electrode probe ports 407 and 408 by using metal wire bonding technology to facilitate the control and operation of the phase modulation electrical signal. Finally, the top cover 406 is covered to the case 401 to complete the encapsulation of the adiabatic coupling phase modulation module 1 to form the adiabatic coupling phase modulation device 2.

Specifically, the adiabatic coupling phase modulation module 1 is placed on the case 401 through a carrier board. In the view from the first side or the second side of the optical substrate 101, the projected shape of the carrier board is as an L-shaped strip structure or a U-shaped structure. A dielectric glue coating may be applied over the carrier board, and an acoustic wave absorbing coating may be applied below the carrier board. The adiabatic coupling phase modulation module 1 is bonded and fixed to the carrier board through a dielectric glue coating. The adiabatic coupling phase modulation module 1 and the carrier board are bonded and fixed on the inner side of the bottom of the casing 401 through the acoustic wave absorbing coating. By applying the dielectric glue coating on the top of the carrier board and the acoustic wave absorbing coating on the bottom of the carrier board, the purpose of absorbing acousto-optic resonance and releasing stress hot electrons can be achieve, thereby reducing the interference of acousto-optic resonance modulation and low waveguide closing effect.

Figure 5:
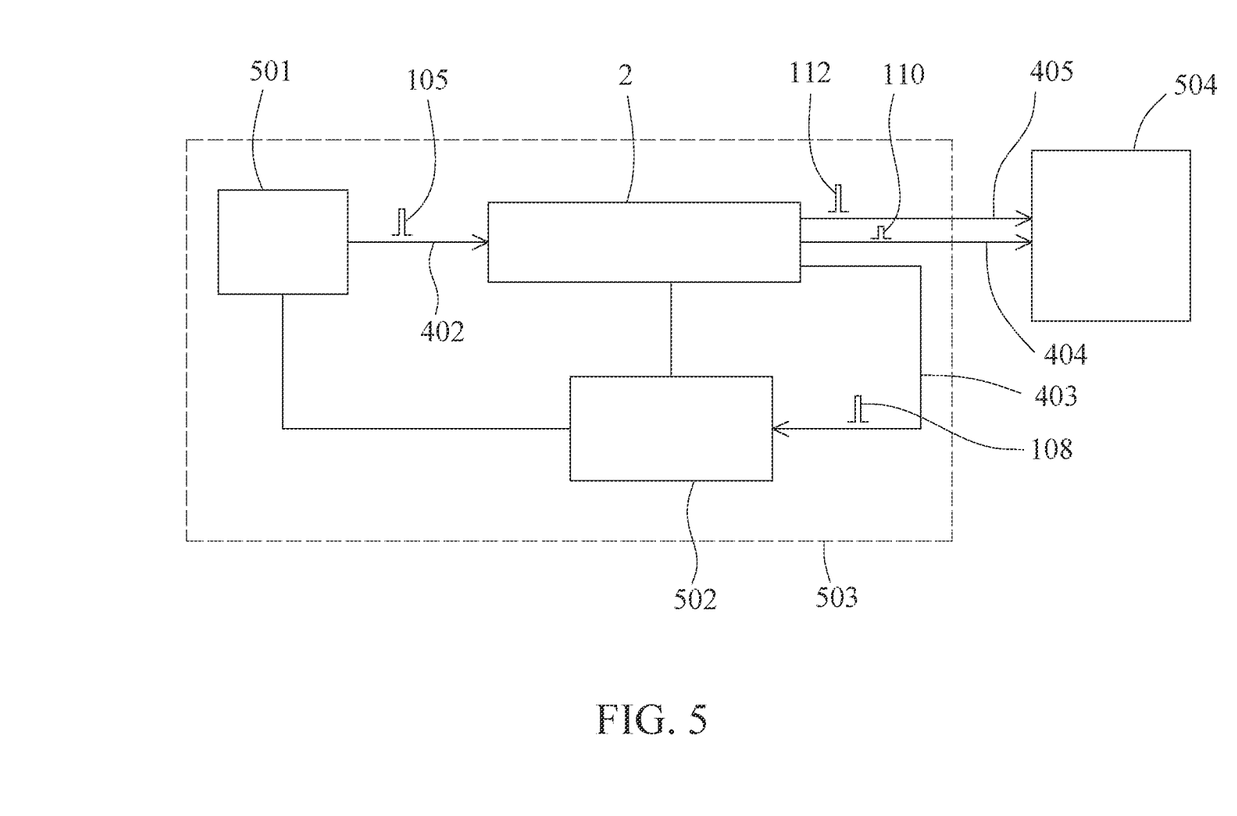
FIG. 5 is schematic diagram showing a quantum key distribution system which is an application of an adiabatic coupling phase modulation device.

Refer to FIG. 1 and FIG. 5, and FIG. 5 is schematic diagram showing a quantum key distribution system which is an application of an adiabatic coupling phase modulation device. The quantum key distribution system using the adiabatic coupling phase modulation device of the embodiment comprises a transmitter module 503 and a receiver module 504. The transmitter module 503 is formed by the adiabatic coupling phase modulation device 2, the quantum light source module 501 and the signal control module 502.

The quantum light source module 501 transmits the quantum light source signal 105 to the adiabatic coupling phase modulation device via the optical fiber assembly 402, and the adiabatic coupling phase modulation device 2 performs band spatial filtering, polarization spatial filtering and signal coding on the quantum light source signal 105, so as to output the first light signal 108, the second light signal 110 and the third light signal 112. The signal control module 502 and the adiabatic coupling phase modulation device 2 are connected to each other, and the signal control module 502 is configured to transmit the phase modulation electric signal to manipulate the corresponding phases of the photons of the second light signal 110 and the third light signal 112. On the other hand, the first light signal 108 can be used as a signal of the feedback mechanism to operate the quantum light source module 501 and the signal control module 502 to improve the efficiency and stability of the quantum key distribution system. The encoded second light signal 110 and the encoded third light signal 112 are finally transmitted to the receiver module 504 via the optical fiber assembly 404 and optical fiber assembly 405 of the optical fiber network, respectively, to complete the task of delivering the quantum key distribution system signal.

Accordingly, compared with the prior art, the adiabatic coupling phase modulation module provided by the present disclosure on the basis of the asymmetric adiabatic coupling splitter component adopts a high polarization selectivity waveguide structure as the polarization spatial filtering structure to improve the polarization extinction ratio characteristics, and can be applied in the quantum key distribution system. Further, in the present disclosure, the structure design of the coplanar waveguide electrodes are respectively added into the independent single channel waveguides, the electro-optic phase modulators for high-speed modulation are integrated into the adiabatic coupling phase modulation module, and thus the purpose of high-speed quantum encoding function can be realized.

The above disclosure is only the preferred embodiment of the present disclosure, and not used for limiting the scope of the present disclosure. All equivalent variations and modifications on the basis of shapes, structures, features and spirits described in claims of the present disclosure should be included in the claims of the present disclosure.

What is claimed is:

1. An adiabatic coupling phase modulation module, comprising:
    an optical substrate, having a first side, a second side, a third side and a fourth side, wherein the second side is opposite to the first side, the third side is opposite to the fourth side, and each of the third side and the fourth side is adjacent to both of the first side and the second side;
    an asymmetric adiabatic coupling polarization beam splitter, formed on the optical substrate and adjacent to the first side of the optical substrate, configured to perform band spatial filtering on a quantum light source signal, so as to output a light source signal of a specific wavelength band, and further configured to perform polarization spatial filtering on the light source signal of the specific wavelength band, so as to output a first orthogonal polarization direction light source signal of the specific wavelength band and a second orthogonal polarization direction light source signal of the specific wavelength band; and
    two electro-optical phase modulators, formed on the optical substrate and adjacent to the second side of the optical substrate, configured to respectively perform phase coding processes on the first orthogonal polarization direction light source signal and the second orthogonal polarization direction light source signal.

2. The adiabatic coupling phase modulation module of claim 1, wherein the optical substrate has a first optical waveguide, a second optical waveguide and a third optical waveguide formed on the optical substrate, the first optical waveguide, the second optical waveguide and the third optical waveguide extend from the first side to the second side, and along a direction from the fourth side to the third side, there are the first optical waveguide, the second optical waveguide and the third optical waveguide arranged; the optical substrate has a band spatial filtering structure formed on the optical substrate and between the first optical waveguide and the second optical waveguide, the optical substrate further has a polarization spatial filtering structure formed on the optical substrate and between the second optical waveguide and the third optical waveguide, and the two electro-optical phase modulation electrodes are respectively formed and arranged on surrounding areas of the second optical waveguide and the third optical waveguide; the first optical waveguide, the second optical waveguide, the third optical waveguide, the band spatial filtering structure, the polarization spatial filtering structure and the electro-optical phase modulation electrodes form the asymmetric adiabatic coupling polarization beam splitter and the two electro-optical phase modulators.

3. The adiabatic coupling phase modulation module of claim 1, wherein the optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

4. The adiabatic coupling phase modulation module of claim 2, wherein each of the first optical waveguide, the second optical waveguide and the third optical waveguide is implemented by a channel waveguide, a diffused waveguide, a ridged waveguide or a buried waveguide.

5. The adiabatic coupling phase modulation module of claim 2, wherein along a direction from the first side to the second side, the band spatial filtering structure gradually departs away from the second optical waveguide and gradually approaches the first optical waveguide, and the band spatial filtering structure is configured to guide the light source signal of the specific wavelength band from the first optical waveguide to the second optical waveguide; along the direction from the first side to the second side, the polarization spatial filtering structure gradually departs away from the third optical waveguide and gradually approaches the second optical waveguide, and the polarization spatial filtering structure is configured to guide the first orthogonal polarization direction light source signal from the second optical waveguide to the third optical waveguide.

6. The adiabatic coupling phase modulation module of claim 2, wherein the polarization spatial filtering structure is implemented by a polarization spatial filtering waveguide, and the polarization spatial filtering waveguide has a high polarization selectivity property, which merely transmits the first orthogonal polarization direction light source signal.

7. The adiabatic coupling phase modulation module of claim 2, wherein the two electro-optical phase modulation electrodes are configured to receive at least one phase modulation electric signal, so as to independently and respectively modulate phase properties of photons in the second optical waveguide and the third optical waveguide.

8. The adiabatic coupling phase modulation module of claim 2, wherein each of the two electro-optical phase modulation electrodes is implemented by a coplanar waveguide electrode with high speed modulation capability, and an insulation layer is disposed between each of the two electro-optical phase modulation electrodes and the optical substrate, wherein the insulation layer is configured to adjust an radio frequency equivalent refractive index to match frequency equivalent refractive index and an optical waveguide modal equivalent refractive index.

9. An adiabatic coupling phase modulation device, comprising:
an adiabatic coupling phase modulation module; and
a package structure, configured to package the adiabatic coupling phase modulation module to form the adiabatic coupling phase modulation device;
wherein the adiabatic coupling phase modulation module comprises:
an optical substrate, having a first side, a second side, a third side and a fourth side, wherein the second side is opposite to the first side, the third side is opposite to the fourth side, and each of the third side and the fourth side is adjacent to both of the first side and the second side;
an asymmetric adiabatic coupling polarization beam splitter, formed on the optical substrate and adjacent to the first side of the optical substrate, configured to perform band spatial filtering on a quantum light source signal, so as to output a light source signal of a specific wavelength band, and further configured to perform polarization spatial filtering on the light source signal of the specific wavelength band, so as to output a first orthogonal polarization direction light source signal of the specific wavelength band and a second orthogonal polarization direction light source signal of the specific wavelength band; and
two electro-optical phase modulators, formed on the optical substrate and adjacent to the second side of the optical substrate, configured to respectively perform phase coding processes on the first orthogonal polarization direction light source signal and the second orthogonal polarization direction light source signal.

10. The adiabatic coupling phase modulation device of claim 9, wherein the optical substrate has a first optical waveguide, a second optical waveguide and a third optical waveguide formed on the optical substrate, the first optical waveguide, the second optical waveguide and the third optical waveguide extend from the first side to the second side, and along a direction from the fourth side to the third side, there are the first optical waveguide, the second optical waveguide and the third optical waveguide arranged; the optical substrate has a band spatial filtering structure formed on the optical substrate and between the first optical waveguide and the second optical waveguide, the optical substrate further has a polarization spatial filtering structure formed on the optical substrate and between the second optical waveguide and the third optical waveguide, and the two electro-optical phase modulation electrodes are respectively formed and arranged on surrounding areas of the second optical waveguide and the third optical waveguide; the first optical waveguide, the second optical waveguide, the third optical waveguide, the band spatial filtering structure, the polarization spatial filtering structure and the electro-optical phase modulation electrodes form the asymmetric adiabatic coupling polarization beam splitter and the two electro-optical phase modulators.

11. The adiabatic coupling phase modulation device of claim 9, wherein optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate.

12. The adiabatic coupling phase modulation device of claim 10, wherein each of the first optical waveguide, the second optical waveguide and the third optical waveguide is implemented by a channel waveguide, a diffused waveguide, a ridged waveguide or a buried waveguide.

13. The adiabatic coupling phase modulation device of claim 10, wherein along a direction from the first side to the second side, the band spatial filtering structure gradually departs away from the second optical waveguide and gradually approaches the first optical waveguide, and the band spatial filtering structure is configured to guide the light source signal of the specific wavelength band from the first optical waveguide to the second optical waveguide; along the direction from the first side to the second side, the polarization spatial filtering structure gradually departs away from the third optical waveguide and gradually approaches the second optical waveguide, and the polarization spatial filtering structure is configured to guide the first orthogonal polarization direction light source signal from the second optical waveguide to the third optical waveguide.

14. The adiabatic coupling phase modulation device of claim 10, wherein the polarization spatial filtering structure is implemented by a polarization spatial filtering waveguide, and the polarization spatial filtering waveguide has a high polarization selectivity property, which merely transmits the first orthogonal polarization direction light source signal.

15. The adiabatic coupling phase modulation device of claim 10, wherein the two electro-optical phase modulation electrodes are configured to receive at least one phase modulation electric signal, so as to independently and respectively modulate phase properties of photons in the second optical waveguide and the third optical waveguide.

16. The adiabatic coupling phase modulation module of claim 10, wherein each of the two electro-optical phase modulation electrodes is implemented by a coplanar waveguide electrode with high speed modulation capability, and an insulation layer is disposed between each of the two electro-optical phase modulation electrodes and the optical substrate, wherein the insulation layer is configured to adjust an radio frequency equivalent refractive index to match frequency equivalent refractive index and an optical waveguide modal equivalent refractive index.

17. A quantum key distribution system, comprising:
a transmitter module, formed by an adiabatic coupling phase modulation device, a quantum light source module and a signal control module; and
a receiver module;
wherein the adiabatic coupling phase modulation device comprises:
an adiabatic coupling phase modulation module; and
a package structure, configured to package the adiabatic coupling phase modulation module to form the adiabatic coupling phase modulation device;
wherein the adiabatic coupling phase modulation module comprises:
an optical substrate, having a first side, a second side, a third side and a fourth side, wherein the second side is opposite to the first side, the third side is opposite to the fourth side, and each of the third side and the fourth side is adjacent to both of the first side and the second side;
an asymmetric adiabatic coupling polarization beam splitter, formed on the optical substrate and adjacent to the first side of the optical substrate, configured to perform band spatial filtering on a quantum light source signal, so as to output a light source signal of a specific wavelength band, and further configured to perform polarization spatial filtering on the light source signal of the specific wavelength band, so as to output a first orthogonal polarization direction light source signal of the specific wavelength band and a second orthogonal polarization direction light source signal of the specific wavelength band; and
two electro-optical phase modulators, formed on the optical substrate and adjacent to the second side of the optical substrate, configured to respectively perform phase coding processes on the first orthogonal polarization direction light source signal and the second orthogonal polarization direction light source signal;
wherein the quantum light source module transmits the quantum light source signal to the adiabatic coupling phase modulation device, the adiabatic coupling phase modulation device performs band spatial filtering, polarization spatial filtering and signal coding on the quantum light source signal, so as to output a first light signal, a second light signal and a third light signal, the second light signal and the third light signal are transmitted to an optical fiber network which perform quantum key distribution processes on the second light signal and the third light signal, and the first light signal is transmitted to the signal control module and acts as a signal for feedback control so as to control the quantum light source module and the signal control module.

18. The quantum key distribution system of claim 17, wherein the optical substrate has a first optical waveguide, a second optical waveguide and a third optical waveguide formed on the optical substrate, the first optical waveguide, the second optical waveguide and the third optical waveguide extend from the first side to the second side, and along a direction from the fourth side to the third side, there are the first optical waveguide, the second optical waveguide and the third optical waveguide arranged; the optical substrate has a band spatial filtering structure formed on the optical substrate and between the first optical waveguide and the second optical waveguide, the optical substrate further has a polarization spatial filtering structure formed on the optical substrate and between the second optical waveguide and the third optical waveguide, and the two electro-optical phase modulation electrodes are respectively formed and arranged on surrounding areas of the second optical waveguide and the third optical waveguide; the first optical waveguide, the second optical waveguide, the third optical waveguide, the band spatial filtering structure, the polarization spatial filtering structure and the electro-optical phase modulation electrodes form the asymmetric adiabatic coupling polarization beam splitter and the two electro-optical phase modulators.

19. The quantum key distribution system of claim 17, wherein optical substrate is a silicon-based material substrate, a III-V material substrate, a silicon substrate, a sapphire substrate, a ceramic substrate, a quartz substrate, a lithium niobate substrate, a lithium tantalate substrate or a potassium titanyl phosphate substrate; each of the first optical waveguide, the second optical waveguide and the third optical waveguide is implemented by a channel waveguide, a diffused waveguide, a ridged waveguide or a buried waveguide; the polarization spatial filtering structure is implemented by a polarization spatial filtering waveguide, and the polarization spatial filtering waveguide has a high polarization selectivity property, which merely transmits the first orthogonal polarization direction light source signal; the two electro-optical phase modulation electrodes are configured to receive at least one phase modulation electric signal, so as to independently and respectively modulate phase properties of photons in the second optical waveguide and the third optical waveguide; each of the two electro-optical phase modulation electrodes is implemented by a coplanar waveguide electrode with high speed modulation capability, and an insulation layer is disposed between each of the two electro-optical phase modulation electrodes and the optical substrate, wherein the insulation layer is configured to adjust an radio frequency equivalent refractive index to match frequency equivalent refractive index and an optical waveguide modal equivalent refractive index.

20. The quantum key distribution system of claim 19, wherein along a direction from the first side to the second side, the band spatial filtering structure gradually departs away from the second optical waveguide and gradually approaches the first optical waveguide, and the band spatial filtering structure is configured to guide the light source signal of the specific wavelength band from the first optical waveguide to the second optical waveguide; along the direction from the first side to the second side, the polarization spatial filtering structure gradually departs away from the third optical waveguide and gradually approaches the second optical waveguide, and the polarization spatial filtering structure is configured to guide the first orthogonal polarization direction light source signal from the second optical waveguide to the third optical waveguide.

* * * * *